May 26, 1953 J. F. JORDAN 2,639,984
CONTINUOUS CUPOLA-BESSEMER PROCESS
Filed Aug. 7, 1952
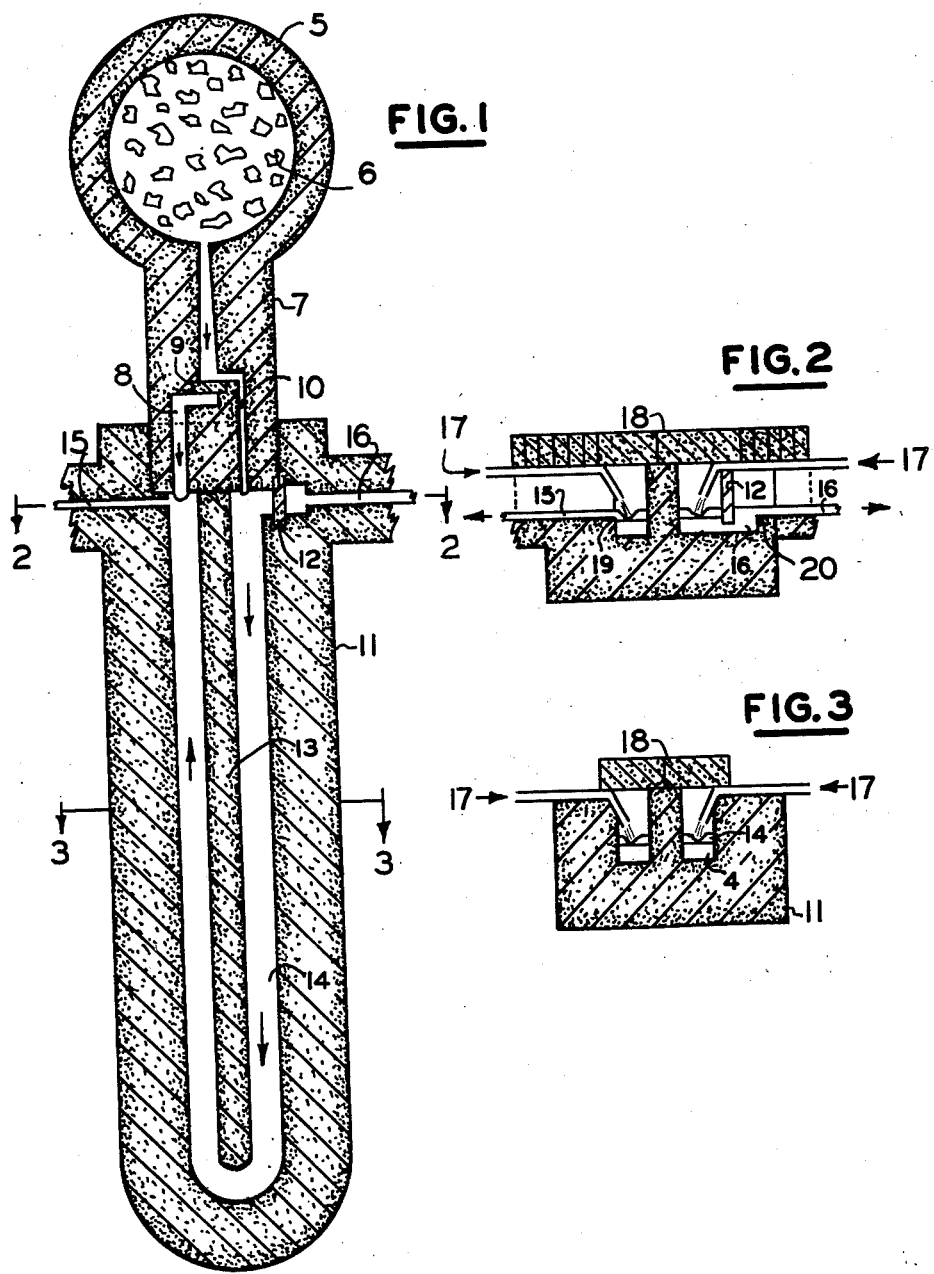
INVENTOR:-
James Fernando Jordan Patented May 26, 1953

2,639,984

UNITED STATES PATENT OFFICE 2,639,984

CONTINUOUS CUPOLA-BESSEMER PROCESS

James Fernando Jordan, Huntington Park, Calif.

Application August 7, 1952, Serial No. 303,059

4 Claims. (Cl. 75—46)

My invention relates to metallurgy wherein a continuous Bessemer process is supplied with crude metal by a coke-fired cupola.

It has been proposed by others that a continuous stream of molten iron be bessemerized by means of a series of air jets which impinge into and are spread out along a stream of iron as said iron stream flows under and in contact with a continuous, countercurrent stream of molten basic slag. My applications, Serial No. 266,918 of January 17, 1952, and Serial No. 254,513 of November 2, 1951, together with my Patent No. 2,595,792, disclose my methods of controlling such a process. In general, my control methods involve my methods of detecting and fixing the location of the completion of the decarburizing process and my method of assuring that all refining action is complete by the time that the decarburizing process is complete, so that my methods of detecting and fixing the completion of the decarburizing process may be employed to detect the completion of all of the refining reactions.

Figure 1 shows an embodiment of my process.

Figure 2 shows section 2—2, indicated in Figure 1.

Figure 3 shows section 3—3, indicated in Figure 1.

When my process is employed to refine an iron of normal composition, the main problem is to assure the completion of the dephosphorizing action by the time that the decarburizing process is complete. When, however, my process is being employed to refine a molten iron obtained by melting steel scrap in a coke-fired cupola, the problems faced in connection with refining this high-sulphur, low-phosphorus material are considerably different from those faced with a low-sulphur, high-phosphorus pig iron, for such cupola metal requires only a moderate amount of dephosphorizing in order to bring the metal down to specification limits, and the precautions of Serial No. 266,918 are not necessary in the production of high quality steel, however, this cupola-melted iron carries a sulphur content considerably in excess of that contemplated in 266,918.

When steel scrap is melted in a coke-fired cupola, the strongly oxidizing action of the melting process results in the wastage of a considerable amount of the metallic charge, and the iron thus lost to the cupola slag has always been a source of expense and concern to those engaged in employing the cupola as a source of hot metal in a steel process.

I have found a method of operating the combination of a coke-fired cupola and a continuous Bessemer process so that the iron lost to the cupola slag is returned to the metallic state to rejoin the metal of my process and so that the mild dephosphorizing action and the strong desulphurizing action are, at the same time, achieved.

My method of accomplishing this involves the use of the molten basic slag that is produced in a basically-lined or water-jacket cupola that is melting steel scrap as the reagent slag of the continuous Bessemer process. Thus, I employ the iron oxide content of the cupola slag to carry out certain of the refining reactions within the Bessemer process, so that a substantial portion of said iron oxide is reduced to iron and so returned to the metal stream of my process.

Countercurrent flow

The preferred embodiment of my process involves the operation illustrated in Figures 1–3. In Figure 1, a basically-lined cupola 5 is fired with the aid of coke 6; the charge of slag-forming constituents into cupola 5 being such that the slag resulting from the melting operation therein is basic—that is, so that said slag has a V-ratio of 1 or more. Cupola 5 is arranged to tap continuously into spout 7, spout 7 being of conventional design in that it is arranged to maintain a pool of slag and metal therein while continuously separating the floating slag stream 10 from the underlying metal stream 8, underflowing, skimming dam 9 being charged with the function of so separating the slag and metal streams. After such separation, metal stream 8 is directed to flow into the slag-exit end of refining trough 11, and slag stream 10 is directed to flow into the metal-exit end of trough 11.

With the slag and metal being introduced into opposite ends of trough 11, the required countercurrent flow of slag and metal is occasioned by the hydraulic heads set up as the underlying metal stream 4 acts against metal-overflow dam 20, and the floating slag stream 14 acts against slag-overflow dam 19, dam 12 at the metal exit end of trough 11 acting to permit the metal product 16 to flow thereunder while forcing slag stream 14 to flow towards slag dam 19 to leave the process as waste slag 15.

For the convenience of the delivery of liquids 8 and 10 to trough 11, trough 11 is formed in the shape of a U, so that the slag and metal entry ends of trough 11 are both located adjacent to spout 7. If desired, however, trough 11 may be straight in the manner disclosed in the previously-listed applications and patent.

As stream 4 of metal 8 flows along trough 11 under and in contact with slag stream 14, a series of air jets 17 are impinged into contact with said streams 4 and 14, resulting in a process of the Bessemer type. Functioning in cooperation with slag 14, air jets 17 convert the impure cupola metal 8 into the refined product 16. For detailed information regarding the operation of such a process, the previously-listed applications and patent should be consulted.

In a number of important ways, however, the process of my present invention differs from my previous disclosures. In the first place, an important part of my refining action is achieved by employing the high iron oxide, high sulphur cupola slag as the refining slag of my process. Thus, in substantial part, recovering the iron oxide produced during the cupola melting of the steel scrap in the cupola, and thus employing a high-sulphur slag to desulphurize my metal stream. In thus bringing the melting cupola into cooperation with a continuous Bessemer trough, I have succeeded in eliminating a number of process steps, while at the same time eliminating one of the most difficult problems connected with the Bessemer process—continuous or batch; that is, the economical use of steel scrap as the metal source in a Bessemer process; for, the inability of the Bessemer process to economically use a high percentage of steel scrap has been one of the most compelling factors in the decreased popularity of the Bessemer process.

In order that full advantage may be gained from my process, a substantial part of the iron oxide content of the cupola slag must be reduced to iron during the course of the refining process, and so returned to the metal stream. In a general sort of way, equilibrium between the metal and slag streams is attained throughout my process. By equilibrium, I do not mean the sort of equilibrium that is attained when the two are held in contact without any outside interference whatsoever, but, rather, a dynamic equilibrium wherein a similar set of process conditions produces a substantially similar set of results. The conditions which control the movement of iron from the slag to the metal are to be found within the metal and slag streams during the early stages of the process. Due to the fact that steel scrap that is melted in a cupola results in a molten metal that is low in silicon and manganese but high in carbon, it is the carbon content of the metal stream that acts as the main reducer of the iron oxide content of the slag. Similarly, while it is the iron oxide content of the slag that we wish to reduce, it is the basicity of the slag that makes such extraction feasible.

In my preferred embodiment, I adjust the charge of slag-forming ingredients into the cupola so that the slag produced therein has a V-ratio of from about 1.7 to 2.4 according to the equation wherein $$\frac{\text{Percent CaO}}{\text{Percent SiO}_2 \text{ plus P}_2\text{O}_5 \text{ Percent}}$$

yields the V-ratio. While it is recognized that other slag constituents have an influence on the effective V-ratio, I am content to figure the V-ratio on the above basis—this, in keeping with the conventional practice in the steel industry. The slag entry end of the refining trough is, at the same time, the metal-exit end of the process, and it is at this end of the process that the V-ratio is most important if a substantial portion of the iron oxide content of the slag is to be reduced, for it is here that the carbon content of the metal stream is highest and the operating temperature is lowest—factors calculated to yield a high iron recovery if the basicity of the slag is such that the iron oxide content of the slag is free to react with the carbon in the metal. For these reasons, I carry a V-ratio of from 1.7 to 2.4 in the slag at the slag-entry end of the trough.

Fortunately, phosphorus reversion from the slag to the metal is a minor factor at the metal-exit end of the trough, due to the extremely-low phosphorus content of the incoming slag and the very low dephosphorizing requirements of the process. The countercurrent flow of slag and metal assures substantially-complete dephosphorization so long as the V-ratio is over 1.0.

Desulphurization is a more difficult problem. Generally speaking, desulphurization takes place in the same refining area as the reduction of the iron oxide content of the slag takes place. This places the desulphurizing action at the metal-entry end of the refining action. While in most desulphurizing processes a more complete desulphurization is attained at higher temperatures and in the essential absence of iron oxide, my process differs in that desulphurization must take place in the presence of a considerable amount of iron oxide. This fact throws the desulphurization to the metal-entry end of the process, for it seems that desulphurization in the presence of a considerable amount of iron oxide is favored by low reaction temperatures. Desulphurization is also favored by a low sulphur value in the contacting slag, and, unfortunately, the factors which throw the desulphurizing action to the metal-entry end of the process also throw the action to that phase of the process wherein the sulphur content of the slag is at its highest level, due to the large amount of sulphur introduced into the slag within the coke-fired cupola.

My refining process involves the use of surface blowing. While at least a portion of the air jets will ordinarily impinge into direct contact with the flowing metal stream, the Bessemer process does not require such direct impingement, for such a Bessemer process is operative even tho the direct influence of the oxidizing air jets is only on the FeO content of the slag. Whether the air jets directly oxidize the metal or not, they always directly oxidize the slag, and such oxidization not only oxidizes FeO to $Fe_2O_3$ but also oxidizes the sulphur content of the slag to the end that $SO_2$ is released therefrom, thus lowering the sulphur content of said slag, and thus increasing the effectiveness of the slag in extracting sulphur from the metal. It is probably this desulphurizing action of the air jets on the slag stream that causes my process to exhibit its strong desulphurizing action.

The strength of the desulphurizing action needed to bring any given cupola-melted, steel scrap to specification limits will depend upon the sulphur content of the cupola metal. This, in turn, will depend upon the nature of the steel scrap charge and upon the quality of the coke employed in the cupola. When employing high-sulphur coke, it may become desirable to implement the overall desulphurizing action of my process. I prefer to do this by inserting a slag-refining pool (not shown) between dam 9 and the slag-entry end of trough 11. If desired, this slag-refining pool may be contained within a separate, refractory-lined vessel. I cause slag 10 to flow continuously into said slag-refining pool while permitting said slag-refining pool to continuous feed the required amount of refined slag into the metal-exit end of trough 11. The refinement of said slag-refining pool is attained by impinging oxygen thereinto, so as to oxidize the sulphur content of slag 10. Any convenient method of passing said oxygen into said slag pool may be employed. While I prefer to employ oxygen for this refining action, air or air enriched with oxygen may also be employed. The advantage in employing oxygen for refining lies in the fact that the maximum desulphurizing action is thereby achieved with the minimum amount of chilling on the molten slag. When employing air as the refining agent, the chilling effect of the refinement may be to some extent offset by employing larger slag-refining pools. Another advantage arising from the positioning of a slag-refining pool between dam 9 and the slag-entry end of trough 11 is that this pool may be employed to act as a surge tank, so as to smooth out the variations in the slag-melting rate of the cupola.

If desired, variations in the metal-melting rate of the cupola may be smoothed out by placing a large pool of metal 8 (not shown) between dam 9 and the metal-entry end of trough 11. Thus, a continuously-feeding mixer may be placed between dam 9 and the metal-entry end of trough 11, so as to smooth out the temperature, rate-of-melting and composition variations of the cupola operation. By employing such a large pool of metal 8, and by employing the mentioned slag-refining pool, the operation of the process of trough 11 will be smoother.

How much of the metallic charge will be oxidized to join the slag within the cupola will depend upon the mean cross section of the steel scrap charge and upon how much the cupola is being forced. If, for one reason or another, the cupola-melting operation is not producing as much iron oxide as the refining process can utilize, and it is desired to increase the yield from the process, iron ore may be deliberately introduced into the cupola charge, so as to lift the amount of iron oxide passing to the refining process via slag 10. If, on the other hand, the cupola-melting operation is producing more iron oxide than the refining process can utilize, the oxidizing action of the cupola on the metallic charge thereinto may be minimized by coating all or part of the metallic charge with a refractory coating that minimizes the oxidizing action of said cupola. This refractory coating may be placed on the metal scrap by simply dipping said scrap into a coating mixture before said scrap is charged into the cupola, the operation being somewhat analogous to the operation wherein a welding rod is coated by dipping.

The cupola of my process should be lined with basic refractories in the manner that is conventional, or said cupola should be of the water-jacket type that has been experimented with in Great Britain in connection with melting ferrous metals and that is widely employed for melting glass-forming ingredients in the manufacture of glass wool. If of the water-jacket type, the cupola bottom may be composed of acid or basic refractories, preferably the latter, and the tap out operation should be arranged so that a pool of molten metal at all times lies on and protects the refractory bottom against the action of the slag being produced within the cupola.

*Concurrent flow*

While I prefer a countercurrent flow of slag and metal in the refining process, a concurrent flow is feasible. This arrangement (not shown in Figures 1-3), involves the concurrent flow of slag and metal thru the refining trough. In concurrent flow, the action of my process differs from the countercurrent-flow type of arrangement in that the desulphurizing action of the process tends to shift from the metal-entry end of the process to the metal-exit end of the process, and the advantages to be derived from the physicochemical effects of countercurrent flow of slag and metal are lost; that is, the strongest oxidizing strength of the slag is located at the same position that the strongest reducing strength of the metal stream is located. While this situation leads to a very violent reaction between the reactants, it is not calculated to drive the desired reactions to completion; for, at the moment that the iron oxide content of the slag is low, and the stronger reducing action is needed, the metal exhibits a weak reducing action.

While a concurrent flow of slag and metal does not have the advantages of countercurrent flow, concurrent flow in accordance with the herein-disclosed combination does have a clear advantage over the prior art in this field; that is, a specification metal may be produced with a higher yield than the processes of the past have exhibited, and, accordingly, the concurrent flow type of process overcomes the difficulties which others have encountered, in the past, in producing a low-sulphur and low-phosphorus steel when employing the cupola as the means for melting steel scrap that is subsequently to be refined by a Bessemer process.

The problems encountered when steel scrap is employed in a cupola-Bessemer operation become serious when the steel-scrap portion of the cupola charge is lifted over 50%, it being assumed that the balance of the charge consists of pig iron and/or cast iron scrap. Accordingly, in referring to the steel scrap of my cupola charge, I mean a cupola charge containing more than 50% steel scrap.

I claim as my invention:

1. In a Bessemer process wherein steel is produced from a molten metal obtained by melting a charge consisting of at least 50% steel scrap in a coke-fired cupola, the improvement, which comprises: melting said charge in contact with a basic slag of a V-ratio above 1.0 within said cupola; and flowing said slag and said metal to a continuous Bessemer process wherein said metal is bessemerized by means of a series of air jets which are spread out along a stream of said metal as said metal stream flows along, under and in contact with said slag, so that said cupola slag acts as the refining slag of said Bessemer process.

2. The process according to claim 1 in which said slag flows in countercurrent contact with said metal during said Bessemer process.

3. The process according to claim 1 in which said slag flows in concurrent contact with said metal during said Bessemer process.

4. The process according to claim 1 in which said slag is separated from said metal before being flowed to said Bessemer process, and in which said separated slag is desulphurized by a gas containing oxygen before being flowed to said Bessemer process.

JAMES FERNANDO JORDAN.

No references cited.